United States Patent
Okaya et al.

[15] 3,656,884
[45] Apr. 18, 1972

[54] PROCESS FOR THE PREPARATION OF GRAFTED SOLID MATERIALS OF WATER-AFFINITIVE POLYMERS

[72] Inventors: Takuji Okaya, 1621, Sakaza; Hirotoshi Miyazaki, 1652, Sakaza, both of Kurashiki City; Tamotsu Eguchi, 19-19 Ekimoto-cho, Okayama City, all of Japan

[22] Filed: Aug. 12, 1968

[21] Appl. No.: 751,720

[30] Foreign Application Priority Data

Aug. 17, 1967 Japan..................................42/53140

[52] U.S. Cl. ................................8/116, 8/DIG. 18, 8/115.5, 8/129, 260/17 A, 260/17.4 GC, 260/857 R, 260/859 R, 260/877, 260/881, 260/885
[51] Int. Cl. .....................................D06m 1/00, C08f 15/00
[58] Field of Search..........................8/116, DIG. 18, 115.5; 260/877

[56] References Cited

UNITED STATES PATENTS

| | | | |
|---|---|---|---|
| 3,475,114 | 10/1969 | Bolinger et al. | 8/127.5 |
| 3,297,786 | 1/1967 | Horowitz | 260/857 |
| 3,073,667 | 1/1963 | Bonvicini | 8/115.5 |

FOREIGN PATENTS OR APPLICATIONS

| | | |
|---|---|---|
| 819,651 | 9/1959 | Great Britain |
| 832,692 | 4/1960 | Great Britain |

OTHER PUBLICATIONS

Dr. Heuck et al. Modern Plastic, Dec. 1946, pp. 158–212

*Primary Examiner*—George F. Lesmes
*Assistant Examiner*—B. Bettis
*Attorney*—Sherman and Shalloway

[57] ABSTRACT

Process for the preparation of grafted solid materials of water-affinitive polymers such as polyvinyl alcohol, acetalized polyvinyl alcohol, polyamide, polyacrylonitrile and cellulose, which comprises immersing said solid material in an aqueous solution or suspension of an ester of acrylic acid or metacrylic acid at a temperature of 40° – 120° C., in the presence of 20 – 1,000 ppb of molecular oxygen, as a reaction initiating component, in the aqueous solution or suspension. In this way, the graft polymerization reaction is initiated smoothly and high reaction rate of the graft polymerization is obtained without the substantial formation of homopolymer of the ester in the liquid phase.

11 Claims, No Drawings

PROCESS FOR THE PREPARATION OF GRAFTED SOLID MATERIALS OF WATER-AFFINITIVE POLYMERS

This invention relates to a process for the preparation of acrylate- or methacrylate-grafted solid materials of water-affinitive polymers.

The above water-affinitive polymer is at least one member of the group consisting of polyvinyl alcohol, acetalized polyvinyl alcohol, polyamide, polyacrylonitrile and cellulose, having a fiber-forming degree of polymerization. Further particulars will become clear from the following description.

Various proposals have been made for the graft polymerization of an ester of acrylic or methacrylic acid to such water-affinitive polymers. Those prior art processes can be classified into the following four large groups:

a. processes utilizing ionizing radiation (U.S. Pat. Nos. 3,088,791 and 3,107,206)

b. processes utilizing ultraviolet rays (British Pat. No. 856,884)

c. processes utilizing catalysts (U.S. Pat. No. 3,046,078 and British Pat. No. 963,711)

d. processes utilizing pre-treatments with ozone or other oxidizing agents (British Pat. Nos. 832,693 and 883,791).

However, those known processes have various deficiencies, for example: the process itself is very complex and it is still difficult to graft polymerize the desired quantity of acrylic monomer to the polymer with satisfactory reproducibility; the homopolymerization of the acrylic monomer takes place in the reaction liquid at a considerably high ratio; or the polymer is deteriorated or colored.

More definitely, the above processes of group (a) utilizing radiation generally comprise irradiating the polymer, e.g., a fibrous material thereof, with an ionizing radiation such as high energy electrons, γ-rays from cobalt-60, etc. and thereafter contacting the irradiated material with the acrylic monomer. However, in the above processes, scission of the main chain of the polymer takes place by the irradiation to cause the degradation of the physical properties of the fiber, such as strength. The processes furthermore are expensive.

Similar drawbacks to the above are also present in the processes of groups (b) and (d) utilizing ultraviolet rays or oxidizing agents such as ozone.

The processes of group (c) comprise, for example, contacting the polymer, which is impregnated with a solution of catalyst such as potassium persulfate or benzoyl peroxide, with the acrylic monomer. Such processes, however, are objectionable in that the formation of homopolymer in the reaction liquid is conspicuous, and furthermore the resulting graft polymers adhere to each other and are discolored by the residual catalyst in the polymers.

Recently, a new grafting process has been reported which comprises immersing a fibrous material in aqueous suspension or emulsion of an ester of acrylic acid or methacrylic acid and heating the same (Makromol. Chem. 89 165 (1965)). According to such process, the acrylic monomer can be graft polymerized to the fibrous material without the use of polymerization catalyst as above mentioned. However, careful examination of such process revealed that the reproducibility of graft polymerization of the process is very poor. That is, even under entirely identical conditions, the degree of grafting and grafting efficiency varied considerably for each run, and in certain cases no graft polymerization took place. Studies were made to clear up the causes of such poor reproducibility, and it was discovered that the concentration of molecular oxygen present in the reaction liquid seriously affects the grafting reaction, inter alia, before the initiation of the reaction. Accordingly the conclusion that the oxygen concentration in the reaction liquid must be very strictly controlled.

Thus, in accordance with the present invention, the graft polymerization of the acrylic monomer to the polymer can be very smoothly carried out by a process comprising immersing in an aqueous solution or suspension of at least one acrylic monomer represented by a formula

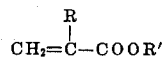

in which R is hydrogen or methyl, and R' is a saturated hydrocarbon residue of one to four carbons, a solid material composed of at least one fiber-forming polymer selected from a group consisting of polyvinyl alcohol, acetalized polyvinyl alcohol, polyamide, polyacrylonitrile and cellulose, and, while maintaining the solid state of the material in the aqueous solution or suspension, causing the presence of 20 – 1,000 ppb of molecular oxygen in the liquid phase of the reaction system as a reaction initiating component, prior to the initiation of the induction period of the reaction, and heating the system to a temperature within a range of 40° – 120° C.

As described above, the first feature in this invention is that, in performing the graft polymerization reaction of the water-affinitive polymers as above explained with an ester of acrylic or methacrylic acid of the foregoing general formula in water in water or aqueous media, the specified quantity of molecular oxygen is caused to be present in the liquid phase of the reaction system, and such specified quantity of molecular oxygen very effectively functions as an initiator of the desired graft polymerization reaction.

According to the invention, as such specific quantity of molecular oxygen, 20 – 1,000 ppb, preferably 80 – 600 ppb, of molecular oxygen to the liquid phase of the reaction system (reaction liquid) is caused to be present in the liquid phase. By the presence of this amount, various advantages as follows are obtained simultaneously:

1. The desired graft polymerization reaction is very smoothly initiated.
2. The reaction rate of the graft polymerization is high.
3. The formation of a homopolymer of the acrylic monomer in the reaction liquid is inhibited, and graft polymerization is permitted to proceed with high grafting efficiency until the degree of grafting reaches as high as several hundred percent. Furthermore, none of objectionable phenomena, such as adhesion, takes place between the solid materials of polymer.
4. The grafting reaction can be controlled to the desired degree of grafting with good reproducibility.
5. The graft polymer is not deteriorated or discolored.
6. The grafting reaction can be performed with extremely low cost.

Incidentally, the term, "degree of grafting" used in the specification is the percentile value calculated by a formula below:

$$\frac{\left[\begin{array}{c}\text{Total weight of po-}\\ \text{lymerized monomer}\\ \text{(A)}\end{array}\right] - \left[\begin{array}{c}\text{Weight of monomer}\\ \text{polymerized in}\\ \text{reaction liquid (B)}\end{array}\right]}{\text{Weight of the solid material of polymer (C) used as the starting material}} \times 100$$

In the above formula, the monomer which is "polymerized in the reaction liquid (B)" refers to the monomer which is polymerized only in the liquid phase of the reaction system, without any substantial chemical bonding with the solid material of the trunk polymer (C).

Also the term "grafting efficiency" is percentile value calculated by a formula below:

$$\frac{\left[\begin{array}{c}\text{Total weight of po-}\\ \text{lymerized monomer}\\ \text{(A)}\end{array}\right] - \left[\begin{array}{c}\text{Weight of monomer}\\ \text{polymerized in}\\ \text{reaction liquid (B)}\end{array}\right]}{\text{Total weight of polymerized monomer (A)}} \times 100$$

An example of the correlation between the initial oxygen concentration in the reaction liquid and the degree of grafting is shown in Table I, wherein formalized polyvinyl alcohol fiber was used as the solid materials of water-affinitive polymers. The grafting conditions were as follows:

FORMALIZED POLYVINYL ALCOHOL FIBER

An 18 percent aqueous solution of 99.9 percent saponified polyvinyl alcohol of a polymerization degree of 1,700 was spun into a 35 percent aqueous solution of sodium hydroxide, and the spun filaments were drawn and heat treated by a draw ratio of 10X and thermal shrinkage of 10 percent respectively. The resultant fiber was then formalized to a degree of formalization of 20.8 percent, with a 10 percent aqueous solution of formalin which was acidified with sulfuric acid. The sample was cut by 64 mm length, and had a denier of 2.5.

AQUEOUS SOLUTION OF MONOMER

| | |
|---|---|
| Methyl methacrylate | 1.3 % |
| Water | 98.7 % |

BATH RATIO

The bath ratio was adjusted to 400 by using 400 parts by weight of the above aqueous solution of monomer per part by weight of the formalized polyvinyl alcohol fiber.

TEMPERATURE

80° C.

The above aqueous solution of monomer was heated to 80° C., and the formalized polyvinyl alcohol fiber was immersed therein. The graft polymerization reaction was subsequently performed at the same temperature.

TIME 60 minutes (the total of the above immersion and grafting reaction periods)

OXYGEN CONCENTRATION

The formalized polyvinyl alcohol fiber was immersed in the aqueous solution of monomer, and the system was well shaken. Immediately thereafter a portion of the reaction liquid (approximately 50 g) was quickly taken out, and the molecular oxygen concentration therein was measured by the Winkler's method. (Incidentally, the Winkler's method is reported in full details in Treadwell. *Analytical Chemistry*, translated by Hall. Vol. 2 "Quantitative", 7th English edition, p. 654, Pub. by John Wiley & Sons, Inc., 1930).

Under the foregoing conditions, the initial concentration of oxygen in the aqueous solution of monomer was varied for each run and graft polymerization was carried out for the predetermined period (60 minutes). The results are shown in Table I below. Incidentally, the oxygen concentration was controlled by blowing nitrogen into the aqueous solution of monomer in advance, for various time lengths periods.

| Oxygen concentration | Degree of grafting (%) |
|---|---|
| 0 | 0 |
| 12 | 5 |
| 20 | 18 |
| 73 | 24 |
| 102 | 43 |
| 210 | 124 |
| 307 | 161 |
| 485 | 115 |
| 672 | 59 |
| 890 | 38 |
| 1071 | 27 |
| 1395 | 7 |

As indicated by the above Table I, the molecular oxygen concentration in the reaction liquid immediately after the immersion of formalized polyvinyl alcohol fiber in the aqueous solution of the monomer, and the degree of grafting are very intimately correlated. Thus the maximum degree of grafting is obtained in the vicinity of approximately 300 ppb of the molecular oxygen concentration in the reaction liquid, and when the concentration is extremely low or exceeds 1,000 ppb, the degree of grafting is lowered.

It was furthermore discovered from the above series of experiments that there exists also a significant correlation between the molecular oxygen concentration in the reaction liquid and the induction period of the graft polymerization reaction. That is, it was confirmed that the induction period tends to be lengthened with increase in the molecular oxygen concentration.

Combining the results of those experiments, therefore, it was determined that the molecular oxygen concentration in the reaction liquid before the reaction is initiated, i.e., immediately after the immersion of solid material of the polymer to be grafted in the aqueous solution of monomer, is significantly related to the degree of grafting and the induction period of grafting reaction. That is, when the initial concentration of molecular oxygen is lower in the reaction liquid, the induction period is shorter but the rate of grafting reaction is reduced and consequently the degree of grafting is less. Also, when initial oxygen concentration is extremely high the rate of grafting reaction becomes higher and the degree of grafting increases, but the induction period becomes objectionably long. Based on the above, it has been established that satisfactory progress of the grafting reaction can be achieved at the molecular oxygen concentration within range of 20 – 1,000 ppb, particularly 80 – 600 ppb.

In addition, it was discovered during the above series of experiments that the progress of the above grafting reaction is also significantly related to reaction temperature. Thus it is confirmed that at the reaction temperatures of 30° C. or below the reaction hardly progresses, but it shows slow progress at 40° C. and above, while vigorously progressing at the temperatures not lower than 50° C., particularly 60° C. However, when the temperature exceeds 100° C., particularly 120° C., homopolymerization of the monomer in the reaction liquid is promoted to reduce the grafting efficiency, which of course is an objectionable tendency. Therefore, satisfactory result is obtained when the grafting reaction of the invention is performed at 40° – 120° C., particularly 60°–90°C.

Thus, it is very important in this invention to control the molecular oxygen concentration in the reaction liquid before initiation of the induction period of the reaction and the reaction temperature to be within the above-specified ranges. The pressure in the reaction system is much less significant. From economical and other considerations, the reaction under normal pressure is most advantageous, but an elevated pressure may be employed without particularly detrimental effect.

Since the essential feature of this invention consists in that the desired grafting reaction commences and progresses in the specified interrelation between the molecular oxygen concentration in the reaction liquid before initiation of the induction period of the reaction and the reaction temperature, the process can be practiced by various operational procedures as follows.

For example, first the molecular oxygen concentration in the aqueous solution of monomer is adjusted to a predetermined value. Separately the solid material of the trunk polymer is immersed in the water from which molecular oxygen has been driven out in advance by blowing nitrogen thereinto, in order to wash off the molecular oxygen occluded in the solid material as much as possible, and thereafter the material is immersed in the aqueous solution of monomer containing molecular oxygen at the adjusted concentration. The system is then heated to a temperature within the specified range.

For another example, an inert gas such as nitrogen may be bubbled through the aqueous solution of monomer to maintain the oxygen concentration in the solution at a low level of below 20 ppb, and into which the solid material is immersed. In this case the solid material may be optionally washed in advance as above described. The system is then heated to a temperature within the above-specified reaction temperature range, and thereafter molecular oxygen is added to the system until the oxygen concentration reaches the predetermined level. In this series of procedures, substantially no reaction takes place even when the reaction liquid is heated, due to the low molecular oxygen concentration in the liquid. Upon blowing of molecular oxygen into the liquid, therefore, after certain induction period, the grafting reaction progresses.

Thus the process according to the present invention can be practiced either batchwise or continuously.

In case of continuous practice, the solid material of the polymer, for example, in the form of fiber or film, is continuously supplied into the bath of aqueous solution of the monomer, and continuously taken out after a fixed period of immersion. In that practice, the monomer is supplied into the bath, i.e., the reaction liquid, either continuously or intermittently, in order to maintain a constant monomer concentration in the bath. The initiation of grafting reaction can be performed as already described, regardless of the manner of practice which may be continuous or batchwise, but in the continuous process, the reaction rate gradually decreases after the progress of the desired grafting reaction for a certain period, because the molecular oxygen as a reaction initiating component is consumed. Therefore, it is preferred for the continuous practice to separately supply appropriate quantities of molecular oxygen into the reaction system, either continuously or intermittently. Preferably the continuous or intermitted oxygen supply is performed to maintain the molecular oxygen concentration of the liquid phase in the continuous reaction system at no lower than 1 ppb, particularly no lower than 5 ppb. Supply of a large quantity of oxygen at one time should be avoided. The upper limit of the permissible quantity of molecular oxygen to be added at one time during the progress of the reaction is that which does not raise the molecular oxygen concentration of the reaction liquid above 800 ppb, preferably not above 600 ppb.

In the process according to the invention, the grafting reaction is initiated in the presence of 20 – 1,000 ppb, preferably 80 – 600 ppb, of molecular oxygen in the reaction liquid as above described, and thereafter the molecular oxygen concentration decreases with the progress of the reaction. However, once the grafting reaction is initiated, it continues to progress even when the oxygen concentration is reduced to below 20 ppb, for example, below 5 ppb or even to undetectable quantity. In case of a continuous practice, the rate of grafting reaction slows down after the progress of the reaction for a certain period as above described. It is experimentally confirmed that the addition of the above-described quantities of oxygen into the reaction liquid at this stage again increases the reaction rate.

Thus, in accordance with the present invention the desired grafting reaction can be very smoothly progressed either batchwise or continuously.

Incidentally, the unit 1 ppb to express the molecular oxygen concentration in the reaction liquid denotes that 1 part by weight of molecular oxygen is contained in each $10^9$ parts by weight of the reaction liquid. Normal underground water, city water or ion exchanged water contains molecular oxygen at concentrations of approximately 6,000 – 15,000 ppb. Comparing with such high concentrations of molecular oxygen, aqueous solution of the monomer containing molecular oxygen at far less concentration must be used as the reaction liquid in the invention. Therefore, as already described, the water to be used as the reaction media or aqueous organic solvent solution and/or the monomer and/or the solid material of trunk polymer must have the molecular oxygen reduced in advance, so as to reduce the molecular oxygen concentration in the reaction liquid to the specified range. The elimination of molecular oxygen can be performed by any suitable means, such as blowing an inert gas such as nitrogen, hydrogen, argon, etc. into those liquids, or by boiling the water to be used in the reaction in advance. Also it is preferred that the content of halogen ions such as chlorine or bromine ion, or acid ions such as sulfate ion, or alkali metal or alkaline earth metal ions such as of sodium, potassium, calcium and magnesium, etc., should be kept to the minimum.

In practicing the present invention, as the reaction liquid containing the monomer i.e., an ester of acrylic or methacrylic acid represented by the formula,

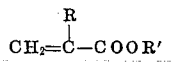

(in which the definitions of R and R' are the same to the foregoing), aqueous solutions in which said esters are completely dissolved are preferred. Because, use of such aqueous solution not only prevents the homopolymerization of the monomers in the reaction liquids and increases the grafting efficiency, but also prevents the adhesion of such homopolymers onto the surfaces of the solid materials, such adhesion being objectionable since the neps formed by the homopolymers on the surfaces of the solid materials render the surfaces coarse, and consequently make difficult such treatments as opening of fibers.

In accordance with the invention, however, a reaction liquid containing the monomer in higher concentration, such as an aqueous suspension in which the monomer is partially dissolved and partially suspended, can be used. The use of such a suspension is advantageous in that, since the suspended monomer is gradually dissolved in the aqueous medium as the grafting monomer dissolved in such medium is consumed by the grafting reaction, the concentration of the dissolved monomer can be maintained constant. However, presence of an excessively large quantity of the monomer in suspended state is objectionable, because of homopolymerization of the monomer on the surfaces of the solid material and also in the reaction liquid, as described in the foregoing.

Accordingly, preferred monomeric content of the aqueous solution or suspension serving as the reaction liquid ranges 0.01 – 20 percent by weight, inter alia, 0.3 – 5 percent by weight. Furthermore, it is particularly preferred to use an aqueous solution of the monomer within the range of the above-specified content of the monomer.

It is permissible to use an emulsifier if the solubility of specific monomer in water is low, but the presence of a large quantity of emulsifier should be avoided. Advantageous results are often obtained, however, by addition of an emulsifier in a quantity of no more than 2 percent of the reaction liquid. The emulsifier may be used also in the cases in which the monomers are completely soluble in water.

In accordance with the invention, an organic solvent which is soluble both in the monomer and water may be added to the reaction liquid in place of emulsifier, whereby an aqueous solution of higher monomer concentration can be prepared.

In practicing the invention, furthermore, the ratio of the quantity of the reaction liquid to the solid material of trunk polymer (bath ratio) is preferably at least 10 parts by weight of the reaction liquid per part by weight of the solid material. It does not matter if a larger quantity of the reaction liquid is used. Thus the grafting reaction can be progressed at a suitable monomer concentration, and furthermore the occurrence of objectionable phenomena as the result of grafting reaction, such as mutual adhesion of solid materials, etc., can be prevented.

It is of course possible to suitably practice the present invention at a bath ratio less than 10:1, for example, by reducing the amount of dissolved monomer in the reaction liquid.

It is very important in the invention that the solid material of the polymer to which the monomer is to be grafted should maintain the solid state in the reaction liquid during the progress of the grafting reaction, and that the quantity of the reaction liquid in the system should be always sufficient to fully immerse the solid material.

The monomer to be used in this invention may be any of the esters of acrylic or methacrylic acid represented by the foregoing formula, the most preferred esters being methyl methacrylate and ethyl acrylate, with which the reaction progressing most smoothly. Of course other esters such as ethyl, propyl or butyl ester of methacrylic acid and methyl, propyl, or butyl ester of acrylic acid are usable.

Those acrylic monomers may also be used in mixture of two or more thereof, or may be used as mixtures with other copolymerizable monomers, for example, styrene, vinyl acetate, acrylic acid, glycidyl methacrylate, vinylpyridine, butadiene, etc. As the copolymerizable monomers, any of vinyl-, divinyl-, and vinylidene-type monomers which are radical copolymerizable with the esters of acrylic or methacrylic acid in the invention in the presence of conventional radical polymerization catalyst can be used.

As the solid material of water-affinitive polymer, any solid material of at least one polymer selected from a group consisting of polyvinyl alcohol, acetalized polyvinyl alcohol, polyamide, polyacrylonitrile and cellulose, can be used.

The polyvinyl alcohol in the above means those polymers obtained by saponifying polyvinyl esters such as polyvinyl formate and polyvinyl acetate, in which at least 90 mol percent of the monomeric unit composing the main chains is vinyl alcohol. Also the acetalized polyvinyl alcohol means the polymers obtained by acetalizing the above polyvinyl alcohol with an aldehyde such as formaldehyde, acetaldehyde, butylaldehyde or benzaldehyde. Polyamide includes, for example, polycapramide, polyhexamethylene adipamide, polyundecanamide, polyhexamethylene sebacate and furthermore all of the polymers containing predominant quantities of amide linkages, such as copolyamides in which no more than approximately 40 percent of the total amide linkage portions in which no more than approximately 40 percent of the total amide linkage portions in the above-named polyamides are replaced by ether, ester or urethane linkages.

Polyacrylonitrile includes homopolymers of acrylonitrile as well as copolymers of acrylonitrile with, for example, vinyl acetate, vinyl chloride, vinylidene chloride or methyl acrylate, the acrylonitrile content of the copolymers being no less than approximately 50 percent.

Also cellulose includes natural and regenerated cellulose, cellulose esters and cellulose ethers.

It is required that the polymers have a degree of polymerization at least sufficient to form fibers, and the "solid material of polymer" refers to fibrous materials such as staple fiber, filament, tow, spun yarn, non-woven fabric, textiles and knit goods, etc., as well as the materials having any geometrical shapes such as board, sheet, film, ribbon, powder, pellet, etc.

It is not always necessary that the solid material is composed of a single polymer, but another polymer such as polyester, polystyrene, polyvinyl chloride, polyethylene and polypropylene may be incorporated in or bonded to the solid material.

The solid material of polymer useful in the invention must be capable of maintaining the solid state during the grafting reaction as aforesaid, and are more or less swellable with water. Such property is referred to as "water affinity" in the specification and claims. All of the above-mentioned polymers exhibit the water affinity although at different degrees. Therefore, as long as this property is retained, the foregoing polymers are usable in the invention as homopolymers as well as copolymers with any compound other than those mentioned as above.

Polyacrylonitrile and polyamide are swollen by water in the degree less than that of polyvinyl alcohol, acetalized polyvinyl alcohol and cellulose. Therefore, the degree of grafting to these two types of polymers is comparatively less. If it is necessary to graft polymerize acrylic monomers to solid materials of polyacrylonitrile or polyamide with high degree of grafting, a water-soluble swelling agent for the polymer may be added to the reaction liquid in such a minor quantity as will not cause dissolving of the polymer in order to increase the apparent degree of swelling of the polymer with water. The useful swelling agents for polyacrylonitrile include, for example, dimethylformamide, dioxane and dimethylsulfoxide, and swelling agents for polyamide include formic acid, isopropyl alcohol, etc.

The grafted solid materials of the water-affinitive polymers produced in accordance with the invention can be put to various valuable utilities in the aforesaid various fibrous forms or as film, ribbon, sheet, powder or board, etc. For example, the fibrous materials exhibit excellent dye-affinity to cation, disperse, and azoic dyes and the like. The textiles also possess unique feeling and sufficient durability for clothing use, furthermore exhibiting excellent crease resistance, pleats retention, wash-and-wear property, pilling resistance, etc.

Also the film, sheet, and board-formed products have excellent adhesibility to, for example, polyvinyl chloride, polymethyl methacrylate, etc., and also high dimensional stability. Therefore, they are the optimum materials for preparation of laminates and tarpaulin.

The powdery and granular materials of the graft polymer can be used as aggregate of paints or molding materials, utilizing their excellent dyeability, dimensional stability and adhesive property.

Hereinafter the invention will be explained in further details with reference to working examples. In the examples, the oxygen concentration in the reaction liquid were in all cases determined by the Winkler's method mentioned in the foregoing unless otherwise indicated. However, the determination of oxygen in the reaction can be performed by procedures other than the Winkler's method such as, for example, polarography, measurement of electric conductivity, or colorimetric analysis. Any of those methods is applicable to the present invention. The results of measurement with any of those methods substantially correspond with the oxygen concentrations in the reaction liquid measured by the Winkler's method.

In the following examples "part" and "percent" are based on the weight, unless specifically mentioned.

EXAMPLE 1

A flask filled with approximately 500 g of water was maintained at 80° – 83° C. in a thermostat, and into which 0.90 g of polyvinyl alcohol fiber (Vinylon, product of Kurashiki Rayon Co., Ltd., degree of polymerization = 1,700, degree of formalization = 33 mol percent, draw ratio = 7 times) was placed, followed by blowing of nitrogen gas thereinto at a rate of 1 l/min. Then, 7.52 g of methyl methacrylate in which molecular oxygen had been displaced with nitrogen in advance was added into the flask, and the flask was sealed airtight. Thus in the flask, an aqueous solution of methyl methacrylate at a concentration of approximately 0.7 weight percent was formed by thorough shaking. Immediately a portion of the reaction liquid (approximately 50 g) was transferred into another flask avoiding any contact with air, and the oxygen content therein was determined. The grafting reaction was performed in the first flask for 30 minutes at 85° C. After termination of the reaction, the homopolymer was extracted from the fiber using a Soxhlet's extractor for 24 hours with acetone. The extracted polymethyl methacrylate was recovered by concentrating the acetone solution and pouring the same into methanol. Colloidal polymethyl methacrylate formed in the reaction liquid was also recovered by adding approximately 0.2 g of sodium sulfate into the liquid remaining after the reaction, colloidal polymethyl methacrylate in the liquid was also recovered. The total of those polymethyl methacrylates thus recovered in two ways was regarded as the quantity of homopolymer formed. The obtained grafted fiber was dried and weighed. The correlation of the initial oxygen concentration in the reaction liquid with degree of grafting and grafting efficiency was as shown in Table 1 below.

TABLE 1

| Oxygen concentration | Degree of grafting (%) | Grafting efficiency (%) |
|---|---|---|
| 14 | 27 | 70 |
| 53 | 74 | 93 |
| 270 | 152 | 93 |
| 512 | 141 | 100 |
| 826 | 75 | 100 |
| 1250 | 34 | 100 |

Grafting conditions:
Initial methyl
methacrylate concentration        approximately 0.7 wt. %

Bath ratio 500
Bath temperature 85° C.
Reaction time 30 minutes

From Table 1, it can be understood that the molecular oxygen concentration in the reaction liquid significantly affects the degree of grafting and grafting efficiency.

For comparison, the molecular oxygen content of the reaction liquid in the foregoing reaction system was reduced to substantially zero, and into which 0.1 weight percent of potassium persulfate based on the weight of reaction liquid was added as a polymerization initiator. After subsequent heating for 30 minutes at 85° C., the homopolymer was recovered from the fiber and reaction liquid in the manners similar to those above described. It was confirmed that the formation of polymethyl methacrylate was conspicuous in the reaction liquid. The degree of grafting was approximately 1 percent, and grafting efficiency was below 1 percent. In this control experiment, benzoyl peroxide or azobisisobutyronitrile cannot be used as the polymerization initiator because of their insolubility in water.

EXAMPLE 2

A polyvinyl alcohol fiber was prepared by spinning the polymer (degree of saponification = 99.9 mol percent) into a coagulation bath of aqueous sodium hydroxide solution, drawing the filaments by 10 times, thermally shrinking the same by 10 percent and mechanically crimping the same. The degree of polymerization of the polyvinyl alcohol was 1,900. One (1.0) g of the same fiber and 300 g of water were put in a 500-cc capacity flask, and nitrogen gas was bubbled through the water for 10 minutes. Then the water was removed from the flask while preventing entrance of air into the flask. Separately, 500 g of water were heated to 75° C. in another flask, and after blowing thereinto a predetermined quantity of nitrogen, 6 g of methyl methacrylate, in which molecular oxygen had been displaced with nitrogen gas in advance were added into the flask. This liquid mixture was added into the first flask and stirred well. Each 100 g of the resultant reaction liquid was taken into different flask while avoiding its contact with air, and molecular oxygen concentration therein was measured. Although the concentration varied somewhat for each sample, generally the concentrations ranged from 230 – 250 ppb. The grafting reaction was performed in all runs at 82° C. The correlation of the reaction time with degree of grafting and grafting efficiency was as shown in Table 2 below.

TABLE 2

| Sample No. | Reaction time (min.) | Degree of grafting (%) | Grafting efficiency (%) |
|---|---|---|---|
| 2-1 | 20 | 20 | 100 |
| 2-2 | 40 | 57 | 100 |
| 2-3 | 60 | 99 | 97 |
| 2-4 | 90 | 145 | 95 |

Grafting conditions:
Initial methyl
methacrylate concentration 1.2 wt %
Bath ratio 400
Bath temperature 82° C.
Molecular oxygen
concentration 230–250 ppb The results of comparing the dyeability of the starting polyvinyl alcohol fiber (sample No. 2–0) with that of the sample 2—2 and 2-3 of Table 2 are shown in Table 3. Also for comparison, dyeability of polyacrylonitrile fiber (Vonnel (registered trade mark), product of Mitsubishi Vonnel Co.) is concurrently given in the same table. The dyeing conditions were as follows:

Cationic dyestuff Astrazon Red BBL
(Color Index: Basic Red 23)
5 % (based on fiber)
Dyeing assistant Sodium lauryl sulfate
4 % (based on fiber)
Note Vonnel was dyed in the conventional manner of dyeing acrylic fibers Dyeing conditions 98° C., 90 minutes, bath ratio: 50
Soaping conditions Washing with 1 g/l aqueous solution of polyoxyethylenealkylether (nonion active agent), 60° C., 30 minutes

TABLE 3

| Sample No. | Degree of grafting, percent | K/S [1] | Wash-fastness [2] Vinylon | Wash-fastness [2] Vonnel | Color change or fading | Light fastness [3] |
|---|---|---|---|---|---|---|
| 2-0 | 0 | 10.1 | 3-4 | 3-4 | 3 | 3 |
| 2-2 | 57 | 20.0 | 5 | 4-5 | 3-4 | 5 |
| 2-3 | 99 | 25.3 | 5 | 5 | 4 | 6 |
| Vonnel | | 19.0 | 5 | 5 | 4-5 | 6 |

[1] Depth of dyed color, calculated from Kubelka-Munk's formula, $$K/S = \frac{(1-r)^2}{2r}$$

wherein r is transmittance reflectance percent at a wave length of maximum absorption.
[2] Determined in accordance with JIS-L-1045-MC-No. 2. The lining materials were Vinylon and Vonnel. (A sample put between white cloths of Vinylon and Vonnel is treated with washing water containing pure soap (Marseillessoap) according to the prescribed method. After washing and drying, discoloration of the sample and the white cloths are compared in tone with the standard color index to determine the grade.)
[3] Measured with a xenonmeter (A sample and standard test pieces are together irradiated with Xenon lamp and thereafter their degree of discoloration are compared with each other to determine the grade.)

From Table 3 above, it can be understood that the grafted fibers obtained in accordance with the invention possess excellent affinity to cation dyes. That is, the color development is excellent, showing even higher K/S values than that of the control Vonnel. Also both wash-fastness and light fastness are satisfactory for practical purposes.

EXAMPLE 3

Benzalized polyvinyl alcohol fiber (product of Kurashiki Rayon Co., Ltd., degree of benzalization = 28 mol percent, degree of polymerization = 1,700) was used as the starting material. One (1.0) gram of this fiber was placed in a 500-cc capacity flask in a thermostat of 70° C. and 400-cc of ion-exchanged water of 75° C. were further poured into the flask. The liquid phase was purged with nitrogen gas, and thereafter 6 cc (5.54 g) of ethyl acrylate in which molecular oxygen had been displaced with nitrogen in advance were added into the flask, followed by thorough stirring. Then approximately 100 cc of the reaction liquid were transferred into a separate flask and the content of the molecular oxygen dissolved therein was measured, while not being contacted with air. The grafting reaction was continued for 90 minutes. The correlation of the initial oxygen concentration in the reaction liquid with the degree of grafting and grafting efficiency was as given in Table 4.

Table 4

| Molecular oxygen concentration (ppb) | Degree of grafting (%) | Grafting efficiency (%) |
|---|---|---|
| 0 | 0 | – |
| 32 | 51 | 92 |
| 295 | 85 | 97 |
| 870 | 20 | 100 |
| 2010 | 3 | 100 |

It is apparent in this series of experiments also that the grafting reaction is significantly affected by the initial molecular oxygen concentration in the reaction liquid.

EXAMPLE 4

A flask filled with approximately 500 g of water was maintained at 80° – 83° C. in a thermostat, and into which 0.90 g of rayon filament was added, followed by blowing of nitrogen gas thereinto at a rate of 2 l/min. Then, methyl methacrylate which had been purged with nitrogen gas in advance was added to the system, and the flask was sealed air-tight. Upon thorough shaking of the flask, the liquid phase was converted to a methyl methacrylate solution at a concentration of approximately 0.8 weight percent. Immediately a portion of the reaction liquid (approximately 50 g) was transferred into a separate flask, avoiding its contact with air, and the molecular oxygen concentration therein was determined. The grafting reaction was performed in the remaining system for 60 minutes at 80° C. The correlation of the oxygen concentration in the reaction liquid with the degree of grafting and grafting efficiency was as given in Table 5.

TABLE 5

| Molecular oxygen concentration (ppb) | Degree of grafting (%) | Grafting efficiency (%) |
| --- | --- | --- |
| 12 | 10 | 53 |
| 61 | 80 | 97 |
| 279 | 127 | 99 |
| 735 | 31 | 100 |
| 1370 | 8 | 100 |

Grafting conditions:
| | |
| --- | --- |
| Initial methyl methacrylate concentration | 0.8 wt % |
| Bath ratio | 500 |
| Bath temperature | 80° C. |
| Reaction time | 60 minutes |

From the Table 5 above, it can be understood that the initial molecular oxygen concentration in the reaction liquid has an important bearing on the degree of grafting and grafting efficiency.

EXAMPLE 5

1.0 g of commercial absorbent cotton (cotton wool) and 300 cc of water were placed in a 500-cc capacity flask, and nitrogen gas was blown into the water for 10 minutes. Then the water was removed from the flask with a proper care to prevent air from entering the flask. Separately, 500 g of water were heated to 75° C. in a different flask, and after blowing thereinto a predetermined quantity of gaseous nitrogen, 6 g of methyl methacrylate, which had been purged with nitrogen gas in advance, were added the flask. This liquid mixture was poured into the first flask and stirred well. Immediately 100 g of the reaction liquid were transferred into a separate flask to have its molecular oxygen concentration measured, while preventing any contact with air. The results somewhat varied depending on each sample, but generally the concentrations ranged from 200 – 230 ppb. The correlation of the reaction time after the inside temperature of the flask was raised to 82° C., with the degree of grafting and grafting efficiency was as given in Table 6 below.

TABLE 6

| Sample No. | Reaction time (min.) | Degree of grafting (%) | Grafting efficiency (%) |
| --- | --- | --- | --- |
| 5-1 | 20 | 13 | 100 |
| 5-2 | 40 | 49 | 100 |
| 5-3 | 60 | 74 | 98 |
| 5-4 | 90 | 108 | 95 |

Grafting conditions:
| | |
| --- | --- |
| Initial methyl methacrylate concentration | 1.2 wt % |
| Bath ratio | 400 |
| Bath temperature | 82° C. |
| Initial molecular oxygen concentration | 200–230 ppb |

EXAMPLE 6

Rayon staple fiber (1.5 deniers) which had been alkali scoured and bleached was used as the starting material. 1.5 g of this staple fiber were placed in a 500–cc capacity flask in a thermostat of 70° C., and into the flask further 400 cc of ion exchanged water of 75° C. were added, followed by bubbling nitrogen gas through the liquid. Then, 6 cc (5.54 g) of ethyl acrylate which had been purged with nitrogen-gas in advance were added to the system and stirred well. Approximately 100 cc of the reaction liquid were transferred into a separate flask while carefully protected from any contact with air to have the molecular oxygen content measured. The grafting reaction in the remaining system was continued for 90 minutes. The correlation of the initial oxygen concentration in the reaction liquid with the degree of grafting and grafting efficiency was as given in Table 7 below.

Table 7

| Molecular oxygen concentration (ppb) | Degree of grafting (%) | Grafting efficiency (%) |
| --- | --- | --- |
| 0 | 2 | – |
| 48 | 37 | 86 |
| 185 | 76 | 98 |
| 621 | 18 | 100 |
| 2340 | 2 | 100 |

From this series of experiments, it is again apparent that the grafting reaction is seriously affected by the molecular oxygen concentration of the reaction liquid.

EXAMPLE 7

A flask filled with approximately 500 g of water was maintained at 80° – 83° C. in a thermostat, and into which 1.0 g of commercial polyacrylonitrile fiber (Vonnel (registered trade mark), product of Mitsubishi Vonnel Co.) was added. Then nitrogen gas was blown into the system at a rate of 1 l/min., followed by addition of methyl methacrylate which has been purged with nitrogen-gas in advance. Shaking the air-tightly sealed flask thoroughly, the liquid phase therein was converted to a methyl methacrylate solution of approximately 0.7 weight percent concentration. Immediately a portion of the reaction liquid (approximately 50 g) was transferred into a separate flask while carefully protected from any contact with air, and the molecular oxygen concentration therein was determined. The grafting reaction in the remaining system was continued for 2 hours at 90° C. The correlation of the oxygen concentration in the reaction liquid with degree of grafting and grafting efficiency was as shown in Table 8.

TABLE 8

| Molecular oxygen concentration (ppb) | Degree of grafting (%) | Grafting efficiency (%) |
| --- | --- | --- |
| 8 | 9 | 65 |
| 42 | 32 | 90 |
| 210 | 71 | 93 |
| 620 | 65 | 95 |
| 812 | 33 | 95 |
| 1130 | 12 | 95 |

Grafting conditions:
| | |
| --- | --- |
| Initial methyl methacrylate concentration | 0.7 wt % |
| Bath ratio | 500 |
| Bath temperature | 90° C. |
| Reaction time | 2 hours |

From the results given in Table 8, it can be understood that the molecular oxygen concentration in the reaction liquid is very closely related to degree of grafting and grafting efficiency.

EXAMPLE 8

A flask was filled with 1.0 g of polyacrylonitrile fiber (Vonnel) and 500 cc of water, and nitrogen gas was blown thereinto for 10 minutes. The water then was removed, while preventing air from entering into the flask. Separately, 500 g of water and 100 g of dimethylformamide were heated to 75° C. in a different flask, and after blowing thereinto a predetermined quantity of nitrogen gas, 8.5 g of methyl methacrylate, which had been purged with nitrogen gas in advance, were poured into the flask. The resultant liquid mixture was poured into the first flask and stirred well, Immediately 100 g of the reaction liquid were transferred into a separate flask while carefully protected from any contact with air, and the molecular oxygen concentration therein was determined. The concentration varied somewhat depending on each sample, but generally the concentrations ranged from 230 – 250 ppb. The correlation of the reaction time after the temperature of the system was raised to 82° C. with the degree of grafting and grafting efficiency was as shown in Table 9.

TABLE 9

| Reaction time (hr.) | Degree of grafting (%) | Grafting efficiency (%) |
|---|---|---|
| 1 | 60 | 100 |
| 2 | 98 | 97 |
| 3 | 120 | 95 |
| 5 | 141 | 95 |

Grafting conditions:
Initial methyl
methacrylate concentration    1.4 wt %
Bath ratio    500
Bath temperature    90° C.
Initial molecular
oxygen concentration    230–250 ppb

EXAMPLE 9

1.0 g of 66 nylon fiber was placed in a 500-cc capacity flask in a thermostat of 85° C., and into which 400 cc of ion exchanged water of 90° C. were added, followed by bubbling nitrogen-gas through the liquid. Then 6 cc of methyl methacrylate, which had been purged with nitrogen-gas in advance, were put in the flask and stirred well. Thereafter approximately 100 cc of the reaction liquid were transferred into a separate flask while carefully protected from any contact with air, and the molecular oxygen concentration was determined. On the other hand, the grafting reaction in the remaining system was continued as it was for 5 hours. The correlation of the initial molecular oxygen concentration in the reaction liquid with the degree of grafting and grafting efficiency was as shown in Table 10.

TABLE 10

| Molecular oxygen concentration (ppb) | Degree of grafting (%) | Grafting efficiency (%) |
|---|---|---|
| 0 | 0 | — |
| 41 | 43 | 90 |
| 263 | 74 | 92 |
| 722 | 18 | 95 |
| 1680 | 2 | 100 |

In this case also it is clear that the grafting reaction is markedly influenced by the initial molecular oxygen concentration in the reaction liquid.

EXAMPLE 10

A tow-like polyvinyl alcohol fiber was prepared by extruding a 17 percent aqueous solution of polyvinyl alcohol having a polymerization degree of 1,700 and a saponification degree of 99.9 mol percent into a 25 percent aqueous solution on sodium sulfate. The fiber was drawn by a draw ratio of 8.5, thermally shrunk by 12 percent and then formalized with a 5 percent aqueous solution of formaldehyde until the fiber had a formalization degree of 32 mol percent. The fineness of the fiber was 1.0 denier.

A vessel A charged with 200 parts of pure water at 95° C. and maintained under nitrogen atmosphere was used for eliminating molecular oxygen contained in the tow-like formalized polyvinyl alcohol fiber by washing, and as the reactor was used, vessel B provided with an inlet for feeding an aqueous emulsion of methyl methacrylate, an inlet for feeding gaseous oxygen and an inlet and an outlet for the tow-like fiber and charged with 1,000 parts of an aqueous solution of methyl methacrylate at a concentration of 1.0 percent by weight. The tow-like fiber was passed through the vessel A and then continuously introduced into the vessel B maintained at 70° C. The fiber was allowed to stay in the reactor B over a period of time of 150 minutes, and then continuously taken therefrom and washed with water. The concentration of methyl methacrylate in the reaction liquid in the reactor B was measured every 15 minutes and an aqueous emulsion of methyl methacrylate [methyl methacrylate content = 100 g/l; emulsifier (polyoxyethylene oleyl ether) content = 5 g/l] was fed via the inlet such that the methyl methacrylate concentration could be maintained at approximately 1.0 percent by weight. The oxygen concentration in the reaction liquid was also measured every 15 minutes, and gaseous oxygen was fed twice such that the concentration could be maintained between 50 and 500 ppb.

The change in the oxygen concentration over a period of time of 165 minutes from the introduction of the fiber into the vessel B is shown in Table 11 below.

TABLE 11

| Reaction time (min.) | Oxygen concentration in reaction liquid (ppb) |
|---|---|
| 0 | 485 |
| 15 | 371 |
| 30 | 289 |
| 45 | 200 |
| 60 | 126 |
| 75 | 71 |
| 80 | Oxygen was supplied |
| 90 | 396 |
| 105 | 325 |
| 120 | 251 |
| 135 | 174 |
| 150 | 90 |
| 160 | Oxygen was supplied |
| 165 | 423 |

The time when the fiber was initially introduced into the reactor B was determined as the starting point.

The measurement of the degree of grafting was performed by extracting a sample of 51 mm length prepared by cutting the tow-like fiber taken from the vessel B, with acetone for 24 hours and subjecting it to thermal cracking gas chromatography.

In the above-mentioned manner it was possible to prepare continuously the grafted fiber of the degree of grafting ranging from 120 to 160 percent.

EXAMPLE 11

One part of polyvinyl alcohol powder (degree of polymerization = 1,700; degree of saponification = 99.9 percent) was thermally treated for 3 minutes at 180° C. and thereafter added to a solution consisting of 5 parts of n-butyl acrylate, 25 parts of methanol and 15 parts of water. Nitrogen gas was bubbled through the system for 10 minutes and the reaction vessel was sealed under nitrogen atmosphere. The oxygen concentration in the reaction liquid was 400 ppb. After the content of the reactor has been maintained at a temperature of 80° C. for 3 hours, the polyvinyl alcohol powder was taken out from the reactor and subjected to Soxhlet extraction method with acetone for 1 day. As a result, powdery polyvinyl alcohol having a degree of grafting of 58 percent was obtained at a grafting efficiency of 64 percent.

The same starting polyvinyl alcohol was subjected to degasification at 120° C. under a reduced pressure of $10^{-3}$ mm Hg, and thereafter added to a vacuum-distilled solution consisting of methanol, water and n-butyl acrylate. The molecular oxygen was completely eliminated by repreating freezing and liquifying the mixture. Thereafter, the reaction vessel was maintained at 80° C. for 3 hours, but no graft polymerization or homopolymerization of n-butyl acrylate was observed.

EXAMPLE 12

To 10 parts of polyvinyl alcohol having a polymerization degree of 1,700 were added 45 parts of acetic acid, 31 parts of water, 8 parts of sulfuric acid and 6 parts of formalin. The mixture was heated at 65° C. for 4 hours to form a solution of formalized polyvinyl alcohol having a formalization degree of 76 mol percent. The resulting solution was charged into a mixer and carbon dioxide gas was blown into the solution to form a foamed solution. This foamed solution there was shaped into sheet-form and then coagulated in an aqueous coagulating bath containing 15 percent of acetic acid and 2 percent of sulfuric acid. The porous article thus obtained had an apparent specific gravity of 0.15. A flask was charged with 0.1 part of this porous article, and introduction of nitrogen to the flask after pressure-reduction at room temperature was repeated three times. Thereafter, a mixed liquid of 0.2 part of methyl methacrylate and 50 parts of water in which molecular oxygen had been displaced with nitrogen were added to the porous article, and the flask was sealed. the oxygen concentration in the reaction liquid was maintained at 400 – 600 ppb prior to the initiation of the induction period. By maintaining the temperature of the flask at 75° C. for 2 hours, a foamed article of grafted porous article of polyvinyl formal having a degree of grafting of 79 percent at a grafting efficiency of 88 percent was obtained.

EXAMPLE 13

Absorbed molecular oxygen on the surface of a cellophane film (0.2 mm thickness) having a weight of 0.050 g was removed therefrom by washing the film with a large amount of water purged with nitrogen gas and immediately the film was added to a mixed liquid of 15 ml of water, 1 ml of methyl methacrylate and 1 ml of styrene containing polyoxyethylene oleyl ether as the emulsifier in an amount of 0.5 g/l, and the reaction vessel was sealed under nitrogen atmosphere. The oxygen concentration in the reaction liquid was 480 ppb. A grafted film of a degree of grafting of 24 percent was obtained at a grafting efficiency of 41 percent by maintaining the temperature of the vessel at 80° C. for 5 hours. As a result of infrared spectrum analysis it was confirmed that the grafted branch was a copolymer of methyl methacrylate with styrene in which the molar ratio of methyl methacrylate to styrene was 1.0:1.1.

EXAMPLE 14

4 g of a commercially available polyacrylonitrile fiber (Vonnel, product of Mitsubishi Vonnel Co.) were charged into a flask having a capacity of 500 cc, and 490 cc of water were further added thereto. The temperature of the flask was raised to 70° C., and after blowing of nitrogen, 9.23 g of ethyl acrylate were added to the flask and it was then well shaked. A part of the reaction liquid was taken from the flask in such a manner that it would not be contacted with air, and the amount of molecular oxygen therein was measured. As a result of the measuring it was confirmed that the reaction liquid contained molecular oxygen at a concentration of 143 ppb. A grafted fiber having a degree of grafting of 64 percent was obtained at a grafting efficiency of 89 percent by heating the flask at a temperature of 70° C. over a period of time of 90 minutes.

EXAMPLE 15

A pressure flask having a capacity of 200 ml was charged with 0.5 g of softwood pulp, 100 g of water and 2 g of polyoxyethylene oleyl ether as the emulsifier, and was heated at 90° C. After nitrogen gas was blown into the flask at a rate of 1 l/min. for 10 minutes, methyl methacrylate and butadiene were added to the flask, following which the flask was sealed, 3 ml of oxygen were injected thereto by means of a syringe and the flask was well shaked. The molecular oxygen concentration in the reaction liquid was measured not by Winkler's method but in accordance with phase equilibrium calculation. As a result, it was confirmed that the molecular oxygen concentration was in the range of from 300 – 400 ppb. The relation of the molar ratios of charged methyl methacrylate and butadiene to the degree of grafting and grafting efficiency after carrying out the graft polymerization at 95° C. for 5 hours is shown in Table 12 below.

TABLE 12

| Molar ratio of charged monomers | | Degree of grafting (%) | Grafting efficiency (%) |
|---|---|---|---|
| Methyl methacrylate | Butadiene | | |
| 0.20 | 0.80 | 17 | 62 |
| 0.30 | 0.70 | 31 | 78 |
| 0.50 | 0.50 | 24 | 72 |
| 0.80 | 0.20 | 44 | 69 |

The content of double bond in the grafted chain was calculated by reacting the graft-polymerized product with bromine, and thus it was confirmed that the grafted branch polymer was a copolymer of methyl methacrylate with butadiene.

EXAMPLE 16

1 part of a fiber prepared from polyvinyl alcohol having a polymerization degree of 1,700 and a saponification degree of 99.9 mol percent, 500 parts of water and sodium lauryl sulfate were mixed together in a flask. After blowing of nitrogen gas, 5 parts of methyl methacrylate and glycidyl methacrylate were further added to the mixture. After sufficient shaking of the flask, the oxygen concentration in the reaction liquid was measured. As a result, it was confirmed that the concentration was 355 ppb. By maintaining the temperature of the flask at 80° C. for 2 hours there was obtained a grafted polyvinyl alcohol fiber having a degree of grafting of 145 percent. The grafted fiber (0.1 part) thus obtained was added to a mixed liquid consisting of 2 parts of pyridine and 1 part of anhydrous acetic acid. After heating at 100° C. for 7 hours, the liquid was poured into a large amount of methanol to separate the resulting polyvinyl acetate. The saponification of the solid polymer was performed in accordance with the conventional method. The product was then dipped into a solution of periodic acid in dimethyl sulfoxide for 8 hours, and thereafter washed with water sufficiently. By the above operation, non-grafted polyvinyl alcohol was removed and a greater part of grafted polyvinyl alcohol was split in the 1,2-glycol bonding portion and removed. The polymer was confirmed, as a result of elementary analysis, to have a composition of about 95 mol percent of methyl methacrylate and about 5 mol percent of glycidyl methacrylate.

What is claimed is:

1. A process for the preparation of grafted solid materials of water-affinitive polymers which consists essentially of immersing a solid material of at least one fiber-forming polymer selected from a group consisting of polyvinyl alcohol, acetalized polyvinyl alcohol, polyamide, polyacrylonitrile and cellulose, in an aqueous solution or suspension of at least one acrylic monomer represented by a formula $$CH_2=\overset{R}{\underset{|}{C}}-COOR'$$

in which R is a hydrogen or methyl, and R' is a saturated hydrocarbon residue of one to four carbons, while maintaining the solid state of the polymeric material in the aqueous solution or suspension, said aqueous solution or suspension being abjusted to contain 20 – 1,000 ppb of molecular oxygen before initiation of the induction period of the reaction, as a reaction initiating component, and heating the aqueous solution or suspension having said fiber-forming polymer immersed therein to a temperature within a range of 40° – 120° C.

2. The process of claim 1 wherein the reaction system is heated to a temperature within a range of 60° – 90° C.

3. The process of claim 1 wherein the acrylic monomer content of the aqueous solution or suspension is within a range of 0.01 – 20 percent by weight.

4. The process of claim 1 wherein the weight of the aqueous solution or suspension is at least ten times the weight of the solid material.

5. The process of claim 1, wherein the solid material is continuously immersed in said aqueous solution or suspension and the monomer is continuously or intermittently supplied to the reaction system so as to maintain the acrylic monomer content at a predetermined concentration in the reaction liquid within a range of 0.01 – 20 percent by weight, while simultaneously supplying molecular oxygen into the system either continuously or intermittently, in such quantities as will not make the molecular oxygen concentration in the liquid phase of the reaction system greater than 800 ppb, and after a predetermined period of immersion continuously taking out the solid material from the reaction system.

6. The process of claim 1 wherein the solid material is staple fiber, filament, tow, spun yarn, non-woven fabric, textiles or knit goods.

7. The process of claim 1 wherein the solid material is in the form of film, ribbon, or sheet.

8. The process of claim 1 wherein the solid material is in the form of powder, pellet or board.

9. The process of claim 1 wherein the polymer is selected particularly from a group consisting of polyvinyl alcohol and acetalized polyvinyl alcohol.

10. The process of claim 1 wherein said aqueous solution or suspension contains 80 – 600 ppb of molecular oxygen.

11. The process of claim 1 wherein the acrylic monomer content of the aqueous solution or suspension is within the range of 0.3 – 5 percent by weight.

* * * * *